(12) United States Patent
Gordon

(10) Patent No.: US 7,529,729 B2
(45) Date of Patent: May 5, 2009

(54) SYSTEM AND METHOD FOR HANDLING IMPROPER DATABASE TABLE ACCESS

(75) Inventor: Mark R. Gordon, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 10/970,270

(22) Filed: Oct. 21, 2004

(65) Prior Publication Data
US 2006/0101029 A1    May 11, 2006

(51) Int. Cl.
G06F 17/30    (2006.01)
G06F 15/16    (2006.01)

(52) U.S. Cl. ............ 707/2; 707/3; 707/4; 707/5
(58) Field of Classification Search ............ None
See application file for complete search history.

(56) References Cited

U.S. PATENT DOCUMENTS

| | | | |
|---|---|---|---|
| 5,960,194 A | | 9/1999 | Choy et al. |
| 6,223,171 B1 * | | 4/2001 | Chaudhuri et al. ............ 707/2 |
| 6,349,305 B1 * | | 2/2002 | Hara et al. ............ 707/102 |
| 6,353,826 B1 * | | 3/2002 | Seputis ............ 707/5 |
| 6,466,942 B1 | | 10/2002 | Tolkin |
| 2003/0093408 A1 * | | 5/2003 | Brown et al. ............ 707/2 |
| 2003/0217059 A1 * | | 11/2003 | Allen et al. ............ 707/10 |
| 2005/0102613 A1 * | | 5/2005 | Boukouvalas et al. ........ 715/513 |
| 2005/0102616 A1 * | | 5/2005 | Thurston ............ 715/513 |
| 2005/0187917 A1 * | | 8/2005 | Lawande et al. ............ 707/3 |

FOREIGN PATENT DOCUMENTS

JP    6139124    5/1994

* cited by examiner

Primary Examiner—Tony Mahmoudi
Assistant Examiner—Dung K Chau
(74) Attorney, Agent, or Firm—Douglas Lashmit; Hoffman Warnick LLC

(57) ABSTRACT

A system and method for identifying and fixing programs and extraneous indexes that improperly accesses tables in an application database system. A method is described including the steps of: defining an incorrect rule set and a related correct rule set for a database model associated with the database system; retrieving index definitions for the database system; comparing the index definitions with the incorrect rule set to identify improper indexes; and identifying programs that depend on the improper indexes.

16 Claims, 2 Drawing Sheets

SYSTEM AND METHOD FOR HANDLING IMPROPER DATABASE TABLE ACCESS

BACKGROUND OF THE INVENTION

1. Related Art

The present invention relates generally to handling improper table access in a database system, and more specifically relates to a system and method for identifying and fixing programs that improperly access tables and removing extraneous indexes that were created to support improper accesses on tables in an application database system.

2. Technical Field

Indexes are an integral part of how programs access data from a relational database system. In particular, indexes allow a data item in a table row, such as a phone number in a phone listing, to be quickly identified and accessed based on a related field, such as a last name, in the same row. Without the index, each of the rows in the table would have to be searched to find the matching row. Accordingly, indexes greatly reduce the time it takes an application to access data from a relational database.

One of the problems associated with complex database systems is that the same data items may be redundantly stored in multiple tables, and application programs may not be designed to retrieve data from its proper place, which is the table where the application has standard indexes to support efficient table access using an index. If a database system has many custom programs and has been in production for several years, administrators and programmers who are not expert on the correct use of the application data model may have written may programs that do not use the tables according to the data model, and database administrators (DBAs) may have created many indexes that would be extraneous if the application data model had been followed.

For example, an invoice number may exist in an invoice table, as well as a payments table. This redundant data in the data model commonly leads to a situation where a programmer developing a program selects rows using a local predicate on a column (e.g., invoice#) in a table (e.g., payment) where the column is present but not indexed for efficient access. This might be done, for example, when the programmer is looking for information related to the payment associated with an invoice. In a typical scenario, the proper place for applications to retrieve rows using the invoice number in accordance with the established data model would be the invoice table, where the associated payment number may also be found. However, a programmer who does not properly understand the data model may design an application that retrieves rows from the payment table, using local predicates on the invoice# to search the payment table by invoice#.

Because the invoice data is not indexed in the payment table, the application will perform slowly. To address this, the programmer or DBA may create a custom index for the payment table. This index is extraneous to the established data model, if the invoice# can be used to perform an indexed retrieval of a row in invoice table which contains a data item which is the key to the payment table. The problem with creating custom indexes is that they can reduce the overall performance of the database system. When unnecessary indexes are defined on a table, the indexes use additional space, and require additional processing, both of which may ultimately impact processing performance. In practice, a complex data model with redundantly stored items leads to situations where application database systems contain many custom, and extraneous, indexes. Unfortunately, there is no simple way to determine how many custom indexes are required, and how many could have been prevented by using the data model correctly.

Ultimately, the problem of using local predicates on the wrong table results either in extraneous indexes reducing the performance of the database system, or applications that are running too slow because they are accessing un-indexed data. Accordingly, a need exists for a system that can identify and facilitate removal of extraneous indexes and/or a system that can identify applications that access data from the wrong table, because the program retrieves the data using local predicates on columns that are not indexed in the standard data model.

SUMMARY OF THE INVENTION

The present invention addresses the above-mentioned problems, as well as others, by providing a system and method for identifying and fixing programs that improperly accesses tables in an application database system and extraneous indexes created to support the incorrect access. In a first aspect, the invention provides a method of analyzing table access in a database system, comprising: defining an incorrect rule set and a related correct rule set for a database model associated with the database system; retrieving index definitions for the database system; comparing the index definitions with the incorrect rule set to identify improper indexes; and identifying programs that depend on the improper indexes.

In a second aspect, the invention provides a system for identifying improper table accesses in a database system, comprising: an inspection system that compares index definitions of the database system with an incorrect rule set to identify improper indexes, and identifies program statements that depend on the improper indexes; and a correction system that proposes corrections based on a correct rule set that is linked to the incorrect rule set.

In a third aspect, the invention provides a program product stored on a recordable medium for analyzing table access in a database system, comprising: program code configured for defining an incorrect rule set and a related correct rule set for a database model associated with the database system; program code configured for retrieving index definitions for the database system; program code configured for comparing the index definitions with the incorrect rule set to identify improper indexes; and program code configured for identifying program statements that depend on the improper indexes.

In a fourth aspect, the invention provides a method of deploying an application for analyzing table access in a database system, comprising: providing a computer infrastructure being operable to: define an incorrect rule set and a related correct rule set for a database model associated with the database system; retrieve index definitions for the database system; and compare the index definitions with the incorrect rule set to identify improper indexes.

Accordingly, the invention offers a way to review, after the fact, the decisions made by the administrative staff and programmers, and determine if there is a more efficient way to provide the same business function, but with less database space and potentially better performance.

The invention can also be incorporated into a real-time or online code inspection tool, where it can review a program as it is being written, compiled or run, in order to prevent programs that access tables incorrectly from being written and added to the application system.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
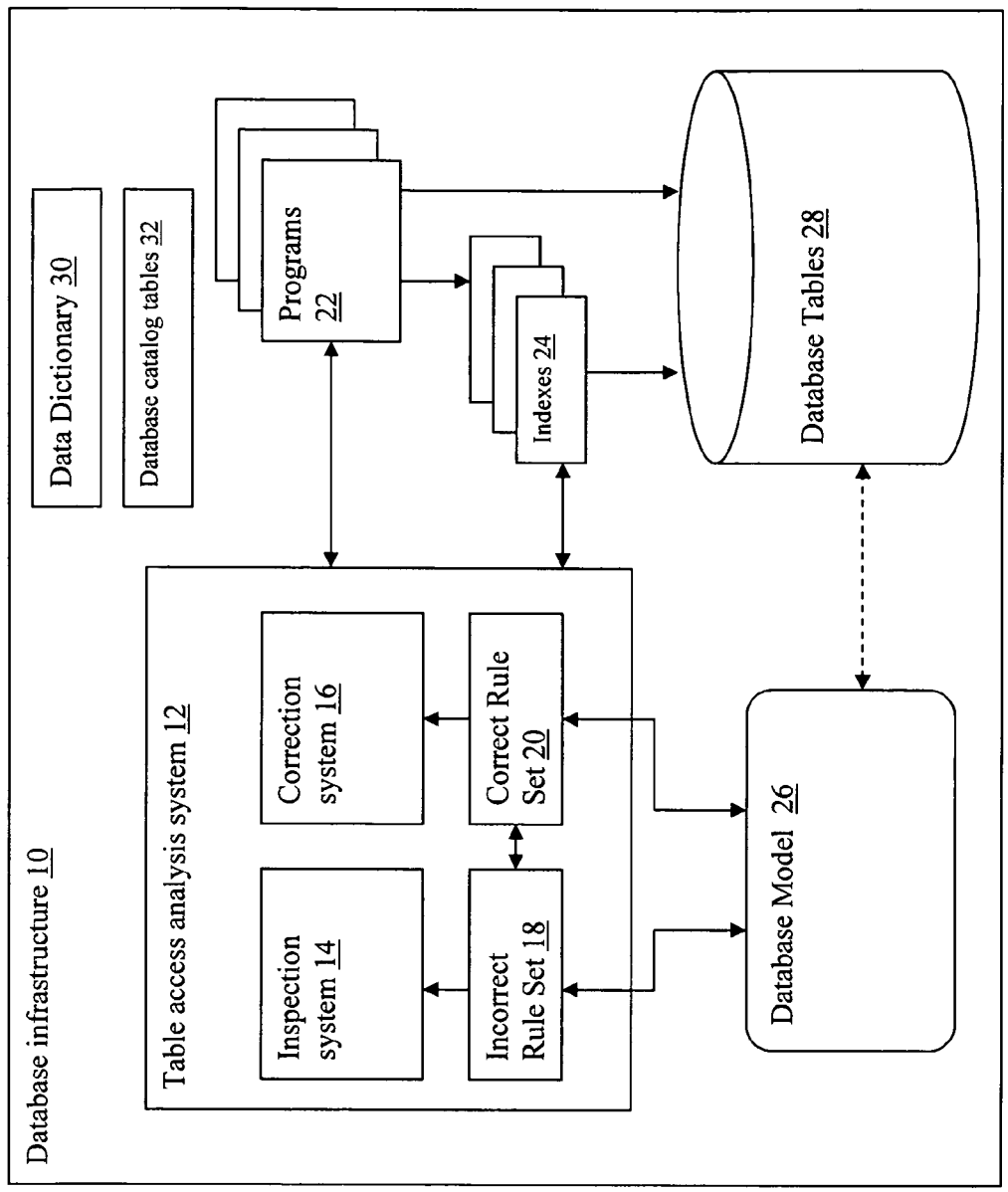
FIG. 1 depicts a database infrastructure having a table access analysis system in accordance with the present invention.

Referring now to the Figures, FIG. 1 depicts a database infrastructure 10 having a table access analysis system 12 for analyzing application programs 22 and/or indexes 24 to determine if data is being retrieved using local predicates on the wrong tables within database tables 28. As described below, table access analysis system 12 can take two approaches for determining if the program is applying local predicates to data items (columns) in the wrong table. Namely, table access analysis system 12 can either initially analyze the application programs 22 to identify improper table access statements, or initially analyze indexes 24 to identify extraneous (i.e., improper) indexes. In the case where application programs 22 are analyzed first, table access analysis system 12 can subsequently identify extraneous indexes based on the improper access statements located in the application programs 22. Conversely, in the case where indexes 24 are analyzed first, table access analysis system 12 can subsequently identify any programs making improper access statements.

In order to implement either approach, two rule sets, "correct data-model use" (i.e., a correct rule set 20) and "incorrect data-model use" (i.e., incorrect rule set 18), are first derived from the database model 26. Incorrect rule set 18 is utilized by inspection system 14 to identify improper table accesses, either by a program or index, and correct rule set 20 is utilized by correction system 16 to either propose or implement a correction.

Each incorrect rule in the incorrect rule set 18 contains a table name and the name of one of the table's columns. This column contains a data item (e.g., an invoice number) that is redundantly stored in multiple tables of the database, and is indexed for efficient retrieval in a different table than the table listed in the incorrect rule. Each rule in the incorrect rule set 18 contains a link to a correct rule in the correct rule set 20 that can be used to fix the error (and vice versa).

Each correct rule contains a step number, a table name, and the names of two of the table's columns. Each step corresponds to an SQL operation which is used to select rows using one column, and retrieve another column. One column is the predicate column that is used for efficient indexed access to the table, and the other column is a result column that can be retrieved and then used for efficient table access in the next step of the correct rule.

For the case where indexes 24 are analyzed, table access analysis system 12 operates as follows. First, inspection system 14 can utilize an application data dictionary 30 or database catalog tables 32 to retrieve information about all indexes defined in the database, e.g., table name, index name, column names and position. The database system catalog contains information about all the objects (tables, views, columns, users) defined in the database. An application data dictionary contains information about all the objects (tables, views, programs, users) defined by the application for the database system. Then, inspection system 14 compares the defined indexes to the rules in the incorrect rule set 18, and generates a list of the indexes which match a rule in incorrect rule set. It then searches the application data dictionary, or program source libraries, comparing the application programs 22 with the indexes matching the incorrect rules, and generates a list of programs which match a rule in incorrect rule set 18. As noted above, inspection system 14 could also be implemented in a real-time or online code inspection tool, where it can review a program as it is being written, compiled/ interpreted or run, in order to prevent programs that access tables incorrectly from being written and added to the application system.

The list of indexes and programs are merged and reported according to rule in the incorrect rule set 18. In this way, administrators can determine the indexes that could be removed, and all the programs that depend on each index. After the programs have been updated, the database administrators can delete the index. The rule sets 18, 20 can be updated, and the process can be re-run, as additional examples of redundantly stored data items are introduced to the application or found in the application.

An example of the process is described below with reference to the flow diagram shown in FIG. 2. Consider the table data model information for an application shown in Exhibit A. Each table has one index defined in the application's implementation of the data model:

Exhibit A:

| Table name | Table columns | Index columns |
|---|---|---|
| Invoice | invoice#, payment#, col3, col4 | invoice# |
| Payment | payment#, invoice#, colC, colD | payment# |

Figure 2:
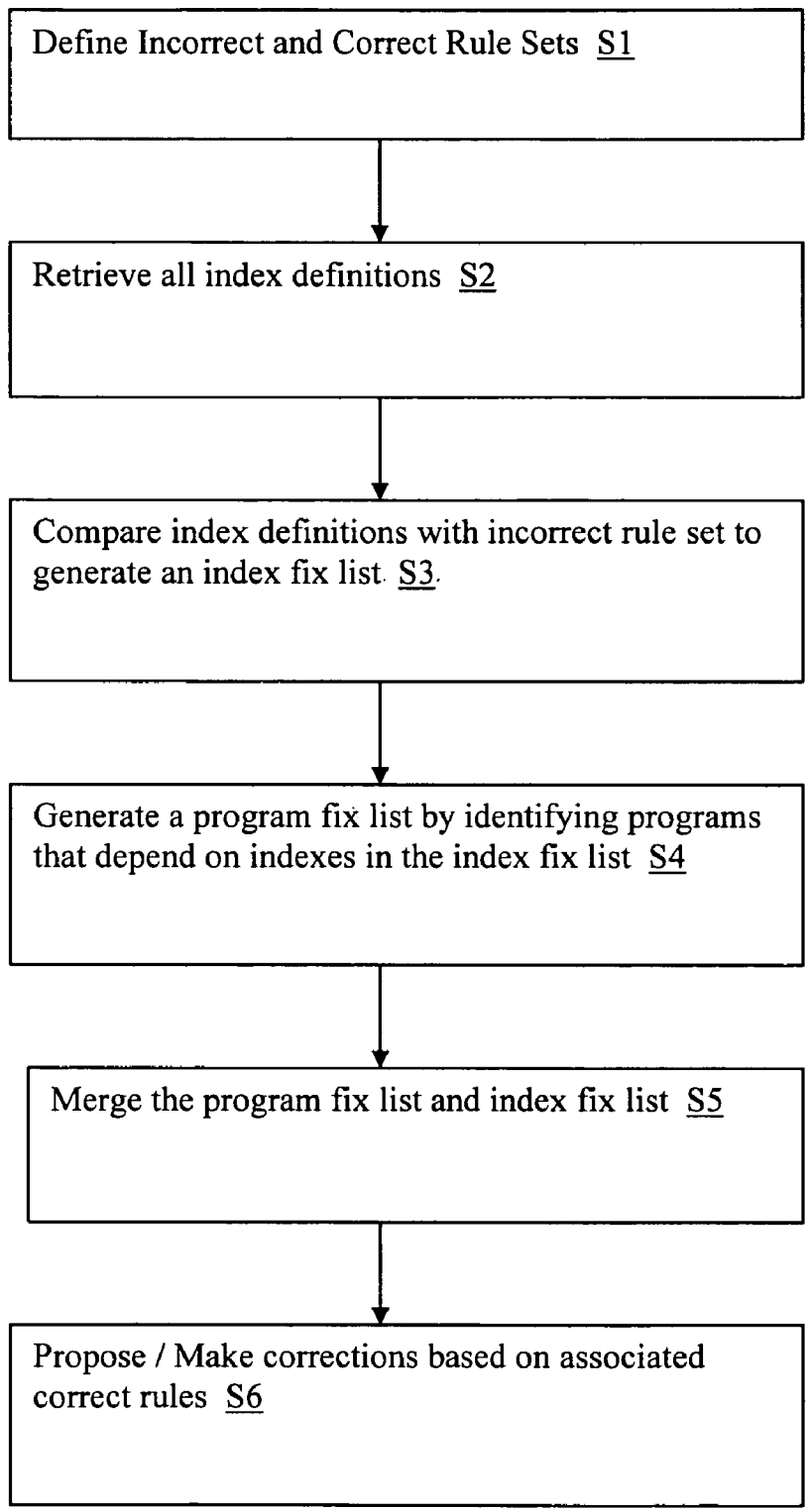
FIG. 2 depicts a flow diagram of a method of implementing the invention.

The first step S1 shown in FIG. 2 is to define an incorrect rule set 18 and a correct rule set 20. For the tables in exhibit A, an incorrect rule set 18 could be defined as:

Exhibit B:

| Incorrect ID | Table | Column | Correct ID |
|---|---|---|---|
| X | payment | invoice# | A |

For the tables in exhibit A, the correct rule set 20 would be:

Exhibit C:

| Correct ID | Table | Predicate Col | Result Col | Sequence | Incorrect ID |
|---|---|---|---|---|---|
| A | invoice | invoice# | payment# | 1 | X |
| A | payment | payment# | any | 2 | X |

For the tables in exhibit A, a program using the data model incorrectly would be:

Exhibit D:

| Program Name | Program source |
|---|---|
| Badprogram | Select colC, colD from payment where invoice# = 1234; |

The next step in the process, step S2, would be to retrieve all index definitions. First, the definitions of all the indexes currently defined in the database are retrieved, such as that shown below in Exhibit E:

Exhibit E:

| Table name | table columns | index column(s) | index name |
|---|---|---|---|
| Invoice | invoice#, payment#, col3, col4 | invoice# | invoice~invoice# |
| Payment | payment#, invoice#, colC, colD | payment# | payment~payment# |
| Payment | payment#, invoice#, colC, colD | invoice# | payment~invoice# |

The next step S3 is to compare index information with the incorrect rule set 18 to generate an index fix list. This can be accomplished, e.g., using the following algorithm:

```
For each index row in exhibit E
    For each rule row in the incorrect rule set (exhibit B)
        If (index table = rule table) and (rule column is contained in index columns)
            The index matches an incorrect rule - save index in 'index fix list'
        Endif
    End
End
```

From the above, the index fix list would be:

Exhibit F:

| Index | Incorrect ID | table | column |
|---|---|---|---|
| Payment~invoice# | X | payment | invoice# |

The next step S4 would be to generate a program fix list by searching for programs that depend on indexes in the "index fix list." The method could search the application source libraries or application data dictionary tables containing source programs for SQL statements referencing the table/column pairs in the index fix list. A program fix list could be generated using the following algorithm:

```
For indexes in the index fix list
    For each program in data dictionary or source library
        If there is SQL referencing the "index fix list table" with a local predicate on "index fix list column"
            The program matches the incorrect rule - save in 'program fix list'
        Endif
    End
End
```

The sample program fix list for the above example would be shown below in exhibit G.

Exhibit G:

| Program | Incorrect ID |
|---|---|
| Badprogram | X |

The following step S5 of the process would be to merge the index fix list and the program fix list, as shown below in exhibit H. The two lists may be merged based on Incorrect ID. Then at step S6, corrections could be proposes and/or implemented. The administrator using this method could determine the proposed program fix from the Correct ID, modify the programs to use the data model correctly, and then remove the now extraneous index.

Exhibit H:

| Incorrect ID | object | proposed action |
|---|---|---|
| X | payment~invoice# | delete index after fixing programs with Incorrect ID X |
| X | badprogram | change SQL according to Correct ID A |

It should be appreciated that table access analysis system 12 of the present invention could be carried out on a stand-alone computer system, or over a network such as the Internet, a local area network (LAN), a wide area network (WAN), a virtual private network (VPN), etc. Suitable computer systems may include a mainframe, a desktop computer, a laptop computer, a workstation, a hand held device, a client, a server, etc. In any event, the computer system may generally comprise, e.g., a processing unit, memory, a bus, input/output (I/O) interfaces, external devices/resources and a storage unit. The processing unit may comprise a single processing unit, or processors distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, similar to processing unit, memory may reside at a single physical location, comprising one or more types of data storage, or be distributed across a plurality of physical systems in various forms.

I/O interfaces may comprise any system for exchanging information to/from an external source. External devices/resources may comprise any known type of external device, including a scanner, a storage device, a network connection, speakers, a hand-held device, a keyboard, a mouse, a voice recognition system, a speech output system, a printer, a monitor/display, a facsimile, a pager, etc.

Database infrastructure 10 may each comprise any type of storage unit capable of providing storage for information under the present invention. As such, the storage units could include one or more storage devices, such as a magnetic disk drive or an optical disk drive. Moreover, the storage units may include data distributed across, for example, a local area network (LAN), wide area network (WAN) or a storage area network (SAN).

Thus, it should also be understood that while the invention is described as a single integrated architecture, the invention could be implemented in a distributed fashion where the components and subsystems do not necessarily reside at the same physical location.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

It should also be appreciated that the teachings of the present invention can be offered as a business method on a subscription or fee basis. For example, a computer system could be created, maintained, supported, and/or deployed by a service provider that offers the functions described herein for customers.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method of analyzing table access in a database system, comprising:
    defining an incorrect rule set and a related correct rule set from a database model associated with the database system;
    retrieving index definitions for the database system;
    comparing the index definitions with the incorrect rule set to identify improper indexes, wherein the improper indexes are identified independently of any SQL processing;
    generating a list of index definitions that match a rule in the incorrect rule set;
    retrieving application programs for the database system;
    comparing application programs with the index definitions that match a rule in the incorrect rule set;
    generating a list of application programs which match a rule in the incorrect rule set;
    merging the list of index definitions with the list of application programs;
    reporting the merged list of index definitions and application programs;
    identifying and storing to memory application programs that depend on the improper indexes; and
    using the related correct rule set to propose changes to the improper indexes and the application programs that depend on the improper indexes.

2. The method of claim 1, wherein each incorrect rule in the incorrect rule set includes a table name, a name of a column in the table containing redundantly stored data that is properly indexed in another table, and a link to a correct rule.

3. The method of claim 2, wherein each correct rule in the correct rule set includes a table name, a name of a predicate column, and a name of a result column.

4. The method of claim 1, wherein the index definitions are retrieved from an application data dictionary.

5. The method of claim 1, wherein the index definitions are retrieved from a set of database catalog tables.

6. A computerized system for identifying improper table accesses in a database system, comprising:
    at least one computer hardware device;
    an inspection system that retrieves index definitions for the database system, compares index definitions of the database system with an incorrect rule set to identify improper indexes, identifies program statements that utilize the improper indexes, wherein the inspection system identifies improper indexes independently of SQL processing, generates a list of index definitions that match a rule in the incorrect rule set, retrieves application programs for the database system, compares application programs with the index definitions that match a rule in the incorrect rule set, generates a list of application programs which match a rule in the incorrect rule set, merges the list of index definitions with the list of application programs; reports the merged list of index definitions and application programs; and
    a correction system that proposes corrections based on a correct rule set that is linked to the incorrect rule set, uses a related correct rule set to propose changes to the improper indexes and the application programs that depend on the improper indexes, and stores the corrections in memory.

7. The system of claim 6, wherein each incorrect rule in the incorrect rule set includes a table name, a name of a column in the table containing redundantly stored data that is properly indexed in another table, and a link to a correct rule.

8. The system of claim 7, wherein each correct rule in the correct rule set includes a table name, a name of a predicate column, and a name of a result column.

9. A program product stored on a computer recordable medium for analyzing table access in a database system, comprising:
    program code configured for defining an incorrect rule set and a related correct rule set from a database model associated with the database system;
    program code configured for retrieving index definitions for the database system;
    program code configured for comparing the index definitions with the incorrect rule set to identify improper indexes independent of SQL processing;
    program code configured for generating a list of index definitions that match a rule in the incorrect rule set;
    program code configured for retrieving application programs for the database system;
    program code configured for comparing application programs with the index definitions that match a rule in the incorrect rule set;
    program code configured for generating a list of application programs which match a rule in the incorrect rule set;
    program code configured for merging the list of index definitions with the list of application programs;
    program code configured for reporting the merged list of index definitions and application programs;
    program code configured for identifying and outputting to memory application program statements that utilize the improper indexes; and
    program code configured for using the related correct rule set to propose changes to the improper indexes and any application programs that depend on the improper indexes.

10. The program product of claim 9, wherein each incorrect rule in the incorrect rule set includes a table name, a name of a column in the table containing redundantly stored data that is properly indexed in another table, and a link to a correct rule.

11. The program product of claim 10, wherein each correct rule in the correct rule set includes a table name, a name of a predicate column, and a name of a result column.

12. A method of deploying an application for analyzing table access in a database system, comprising:
   providing a computer infrastructure to:
      define an incorrect rule set and a related correct rule set from a database model associated with the database system;
      retrieve index definitions for the database system independent of SQL processing;
      compare the index definitions with the incorrect rule set to identify improper indexes;
      generate a list of index definitions that match a rule in the incorrect rule set;
      retrieve application programs for the database system;
      compare application programs with the index definitions that match a rule in the incorrect rule set;
      generate a list of application programs which match a rule in the incorrect rule set;
      merge the list of index definitions with the list of application programs; and
      report the merged list of index definitions and application programs;
      store the improper indexes in memory; and
      using the related correct rule set to propose changes to the improper indexes and the application programs that depend on the improper indexes.

13. The method of claim 12, wherein the providing computer infrastructure identifies program statements that utilize the improper indexes.

14. The method of claim 13, wherein the process of identifying program statements that utilize the improper indexes is done as the program is being written.

15. The method of claim 13, wherein the process of identifying program statements that utilize the improper indexes is done as the program is being compiled or interpreted.

16. The method of claim 13, wherein the process of identifying program statements that utilize the improper indexes is done as the program is being run.

* * * * *